(12) United States Patent
Hickman

(10) Patent No.: US 11,397,508 B1
(45) Date of Patent: Jul. 26, 2022

(54) VIRTUAL EXPERIENCE PILLARS

(71) Applicant: Hyper Reality Partners, LLC, Kansas City, MO (US)

(72) Inventor: Curtis Hickman, Pleasant Grove, UT (US)

(73) Assignee: Hyper Reality Partners, LLC, Kansas City, MO (US)

( * ) Notice: Subject to any disclaimer, the term of this patent is extended or adjusted under 35 U.S.C. 154(b) by 0 days.

(21) Appl. No.: 16/898,270

(22) Filed: Jun. 10, 2020

Related U.S. Application Data

(60) Provisional application No. 62/860,206, filed on Jun. 11, 2019.

(51) Int. Cl.
  *G06F 3/04815* (2022.01)
  *G02B 27/01* (2006.01)
  *G06T 13/40* (2011.01)
  *G06F 3/01* (2006.01)

(52) U.S. Cl.
  CPC ..... *G06F 3/04815* (2013.01); *G02B 27/0172* (2013.01); *G06F 3/011* (2013.01); *G06T 13/40* (2013.01)

(58) Field of Classification Search
  CPC . G06F 3/04815; G06F 3/011; G02B 27/0172; G06T 13/40
  See application file for complete search history.

(56) References Cited

U.S. PATENT DOCUMENTS

| | | | |
|---|---|---|---|
| 2013/0141418 A1* | 6/2013 | Edholm | G06N 3/006 345/419 |
| 2016/0260252 A1* | 9/2016 | Kim | G06F 3/0487 |
| 2018/0059902 A1* | 3/2018 | Martin | G06F 3/04815 |
| 2019/0018554 A1* | 1/2019 | Fitzgerald | H04N 13/361 |
| 2019/0156404 A1* | 5/2019 | Gabriele | G07F 9/023 |
| 2019/0310757 A1* | 10/2019 | Lee | G06F 3/017 |
| 2020/0074668 A1* | 3/2020 | Stenger | G06T 7/0002 |

* cited by examiner

*Primary Examiner* — Beau D Spratt
(74) *Attorney, Agent, or Firm* — Erise IP, P.A.

(57) ABSTRACT

Described herein are techniques for providing a virtual experience including, but not limited to, the use of a virtual experience "pillar," or virtual rotation of a virtual area and/or a participant in the virtual area. The entry of a participant into a physical environment via a physical entrance area is detected. The participant uses a head-mounted display (HMD) to view a virtual environment associated with the physical environment, the virtual environment including a virtual entrance coinciding with the physical entrance area. An outer virtual environment, and a virtual pillar upon which a virtual avatar representing the participant stands, are caused to be displayed in the virtual environment viewed by the participant.

17 Claims, 10 Drawing Sheets

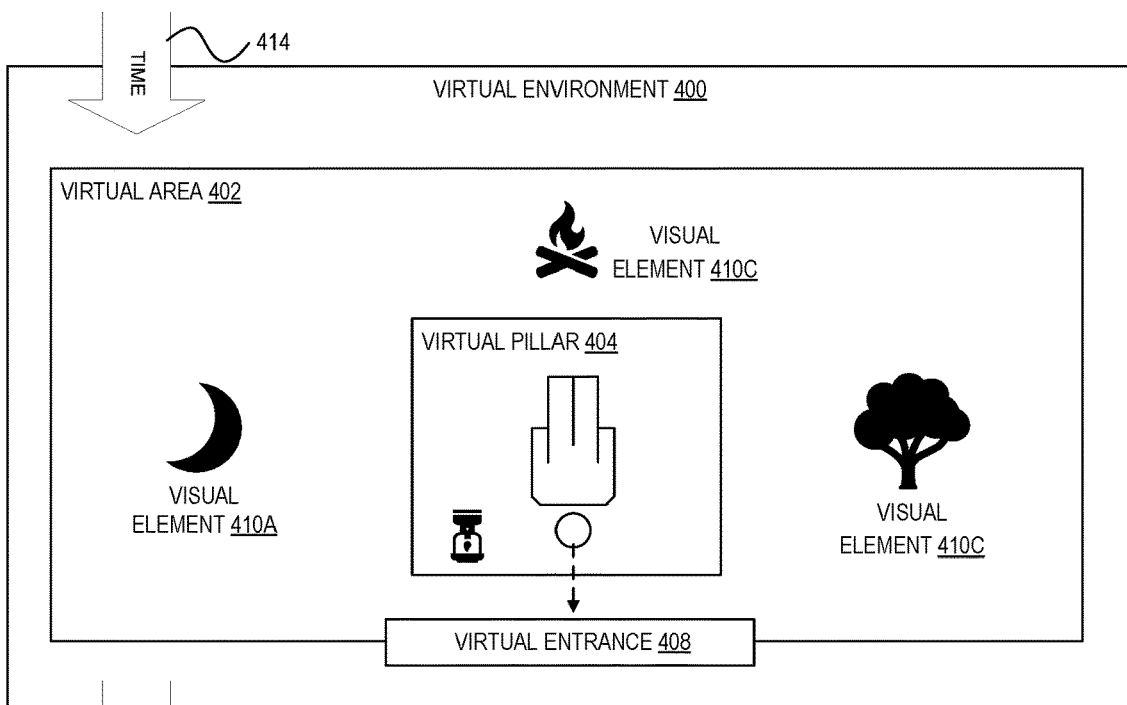
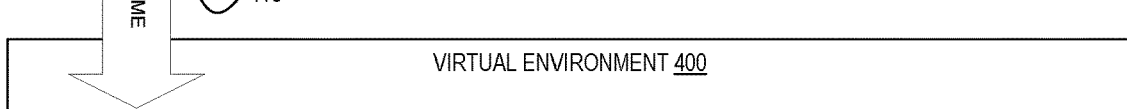
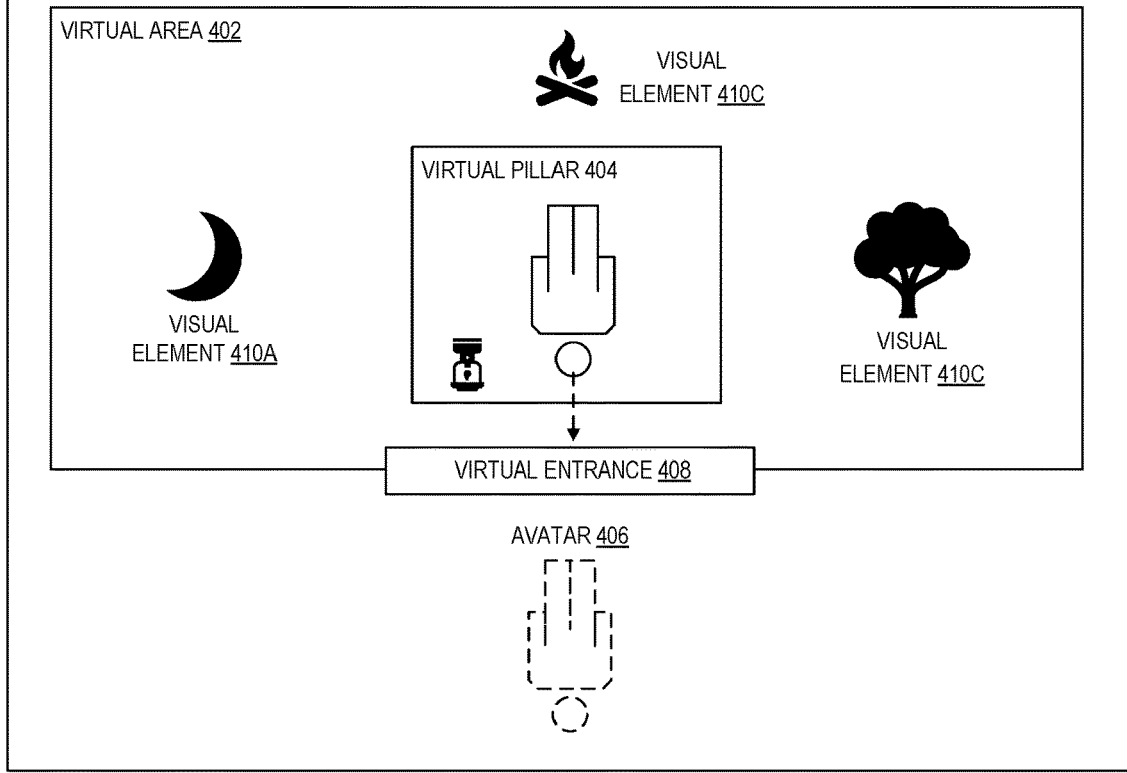
FIG. 4B

VIRTUAL EXPERIENCE PILLARS

CROSS-REFERENCE TO RELATED APPLICATIONS

This application claims the benefit of and priority to U.S. Provisional Patent Application Ser. No. 62/860,206, filed Jun. 11, 2019, which is incorporated herein by reference in its entirety.

BACKGROUND

The market for virtual experiences has vastly increased in recent years. Virtual experience systems allow users to explore virtual spaces. Some virtual experience systems rely on a head-mounted display (HMD) worn by participants and through which the participants visually experience a virtual experience environment.

BRIEF DESCRIPTION OF DRAWINGS

Various embodiments in accordance with the present disclosure will be described with reference to the drawings, in which:

FIGS. 4A and 4B are diagrams illustrating one example of a participant's experience in a virtual environment including a virtual experience pillar according to some embodiments.

DETAILED DESCRIPTION

The present disclosure relates to methods, apparatus, systems, and non-transitory computer-readable storage media for providing a virtual experience including, but not limited to, the use of a virtual experience "pillar," or virtual rotation of a virtual area and/or a participant in the virtual area. According to some embodiments, the entry of a participant into a physical environment via a physical entrance area is detected. In some embodiments, the participant uses a head-mounted display (HMD) to view a virtual environment associated with the physical environment, the virtual environment including a virtual entrance coinciding with the physical entrance area. An outer virtual environment, and a virtual pillar upon which a virtual avatar representing the participant stands, are caused to be displayed in the virtual environment viewed by the participant.

In some embodiments, a virtual pillar is rotated relative to the outer virtual environment, where the rotation of the virtual pillar causes the participant's view in the virtual environment to rotate while the participant remains stationary in the physical environment. Upon reaching a defined amount of rotation, the virtual pillar is caused to stop rotating. In some embodiments, a virtual egress area is displayed in the virtual environment that coincides with the same physical entrance area (or a different physical entrance area), where the virtual entrance area and the virtual egress area appear spatially distant in the participant's view of the virtual environment. Among other benefits, the use of a virtual experience pillar can provide an expansive experience within a virtual experience environment that can be experienced by participants within a relatively more constrained or differently oriented physical environment.

Figure 1:
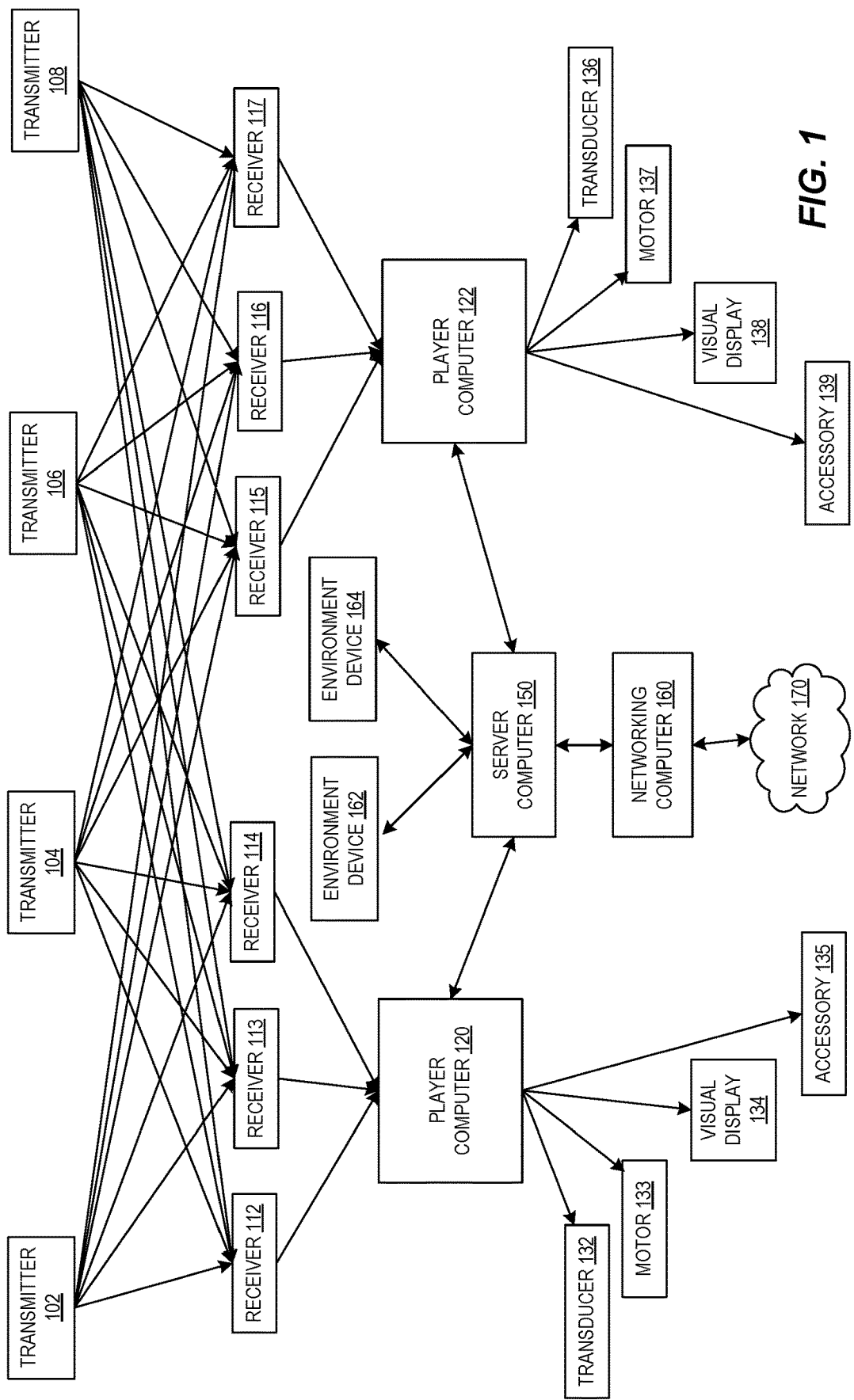
FIG. 1 is a block diagram illustrating an exemplary system for providing a virtual experience.

FIG. 1 is a block diagram illustrating a system for providing a virtual environment and experience according to some embodiments. The system of FIG. 1 includes transmitters 102, 104, 106 and 108, receivers 112, 113, 114, 115, 116 and 117, player (or participant) computers 120 and 122, transducers 132 and 136, motors 133 and 137, visual displays 134 and 138, accessories 135 and 139, server computer 150, environment devices 162 and 164, networking computer 160, and network 170.

Receivers 112-117 may be placed on a player or an accessory 135. Each receiver may receive one or more signals from one or more of transmitters 102-108. The signals received from each transmitter may include an identifier to identify the particular transmitter. In some instances, each transmitter may transmit an omnidirectional signal periodically at the same point in time. Each receiver may receive signals from multiple transmitters, and each receiver may then provide signal identification information and timestamp information for each received signal to player computer 120 (also referred to as a participant computer). By determining when each transmitter signal is received from a receiver, player computer 120 may identify the location of each receiver.

Player computer 120 may be positioned on a player, such as for example on the back of a vest worn by a player. For example, with respect to FIG. 2, player computer 150 is positioned on a back of a player 200. A player computer may receive information from a plurality of receivers, determine the location of each receiver, and then locally update a virtual environment accordingly. Updates to the virtual environment may include a player's point of view in the environment, events that occur in the environment, and video and audio output to provide to a player representing the player's point of view in the environment along with the events that occur in the environment.

Player computer 120 may also communicate changes to the virtual environment determined locally at the computer to other player computers, such as player computer 122, through server computer 150. In particular, a player computer for a first player may detect a change in the player's position based on receivers on the player's body, determine changes to the virtual environment for that player, provide those changes to server computer 150, and server computer 150 will provide those updates to any other player computers for other players in the same virtual experience session, such as a player associated player computer 122.

A player, or participant, may have multiple receivers on his or her body. Each body-worn receiver receives information from one or more transmitter and provides that information to the player computer and/or server computer 150. In some instances, each receiver may provide the data to the player computer wirelessly, such as for example through a radiofrequency signal such as a Bluetooth® signal. In some instances, each receive may be paired or otherwise configured to only communicate data with a particular player computer. In some instances, a particular player computer may be configured to only receive data from a particular set of receivers. Based on physical environment events such as a player walking, local virtual events that are provided by the player computer, or remote virtual events triggered by an element of the virtual environment located remotely from the player, player haptic feedback may be triggered and sensed. The haptic feedback may be provided in the terms of transducer 132 and/or motor 133. For example, if an animal or object touches a player at a particular location on the player's body within the virtual environment, a transducer located at that position may be activated to provide a haptic sensation of being touched by that object. Note that transducers in an environmental device may also provide haptic feedback.

Visual display 134 may be provided through a headset worn by a participant. The visual display 134 may include a helmet, visual display, and other elements and components needed to provide a visual and audio output to a participant. In some instances, player computer 120 may generate and provide virtual environment graphics to a player through the visual display 134.

Accessory 135 may be an element separate from the player, in communication with player computer 120, and displayed within the virtual environment through visual display 134. For example, an accessory may include a gun, a torch, a light saber, a wand, or any other object that can be graphically displayed within the virtual environment and physically engaged or interacted with by a participant. Accessories 135 may be held by a participant, touched by a participant, or otherwise engaged in a physical environment and represented within the virtual environment by player computer 120 through visual display 134.

Server computer 150 may communicate with player computers 120 and 122 to receive updated virtual information from the player computers and provide that information to other player computers currently active in the virtual experience session. Server computer 150 may store and execute a virtual experience engine, such as Unity game engine, Leap Motion, Unreal game engine, or another virtual experience engine. Server computer 150 may also provide virtual environment data to networking computer 160 and ultimately to other remote locations through network 170.

Environment devices 162 and 164 may include physical devices that are a part of the physical environment that may interact or be detected by a participant or other aspects of the gaming system. For example, and enter environment device 162 may be a source of heat, cold, wind, sound, smell, vibration (such as provided by one or more transducers in the floor, for example), or some other sense that may be detected by a participant.

Figure 2:
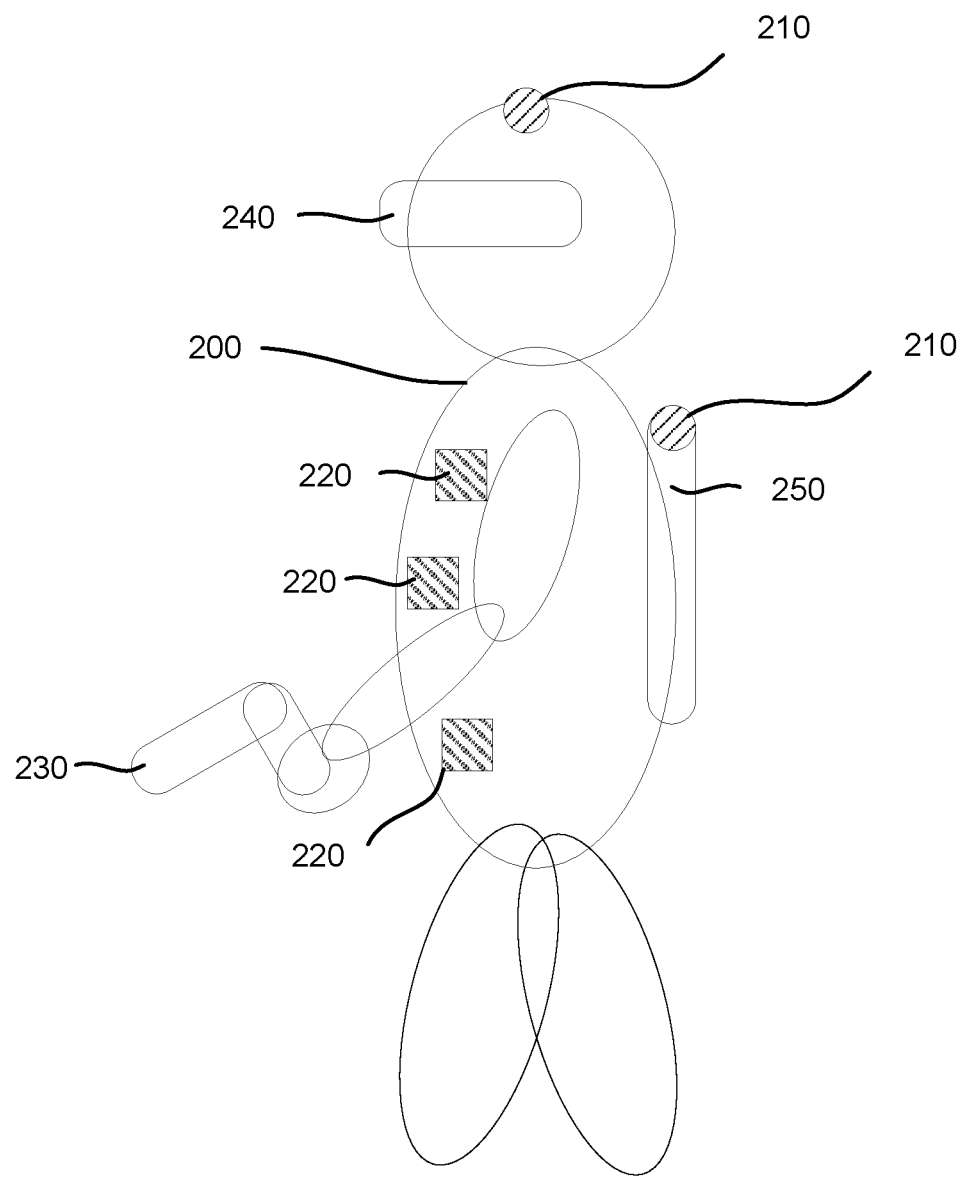
FIG. 2 is a block diagram illustrating a participant of a virtual experience according to some embodiments.

FIG. 2 is a block diagram of a player 200, also referred to herein as a participant, according to some embodiments. Player 200 may include one or more receivers 210, a plurality of haptic devices 220, one or more accessories 230, visual display 240, and player computer 250. As shown, one or more receivers 210 may be placed in multiple locations over a player's body. In some instances, receivers are placed on clothing that may be worn or attached to the player such as a vest housing the player computer 250. As a virtual session is experienced by the player, the location of each receiver will be determined by player computer 250 based on signal ID information and timestamp information received by each and every receiver by the player computer 250. Based on physical environment events, local virtual events, and remote virtual vents, haptic feedback may be provided to a player through one or more haptic devices 220.

Each haptic device 220 may include one or more transducers or motors positioned on the clothing or otherwise attached to a player in such a way as to provide haptic feedback that can be sensed by the player. Accessory 230 may be held by a player and may also include one or more receivers and haptic devices, each of which may have a similar functionality as those placed on a player's body. A heads-up display unit 240 provides a player with graphic display, textual information, audio information, and other information for a virtual session as provided by player computer.

Figure 3:
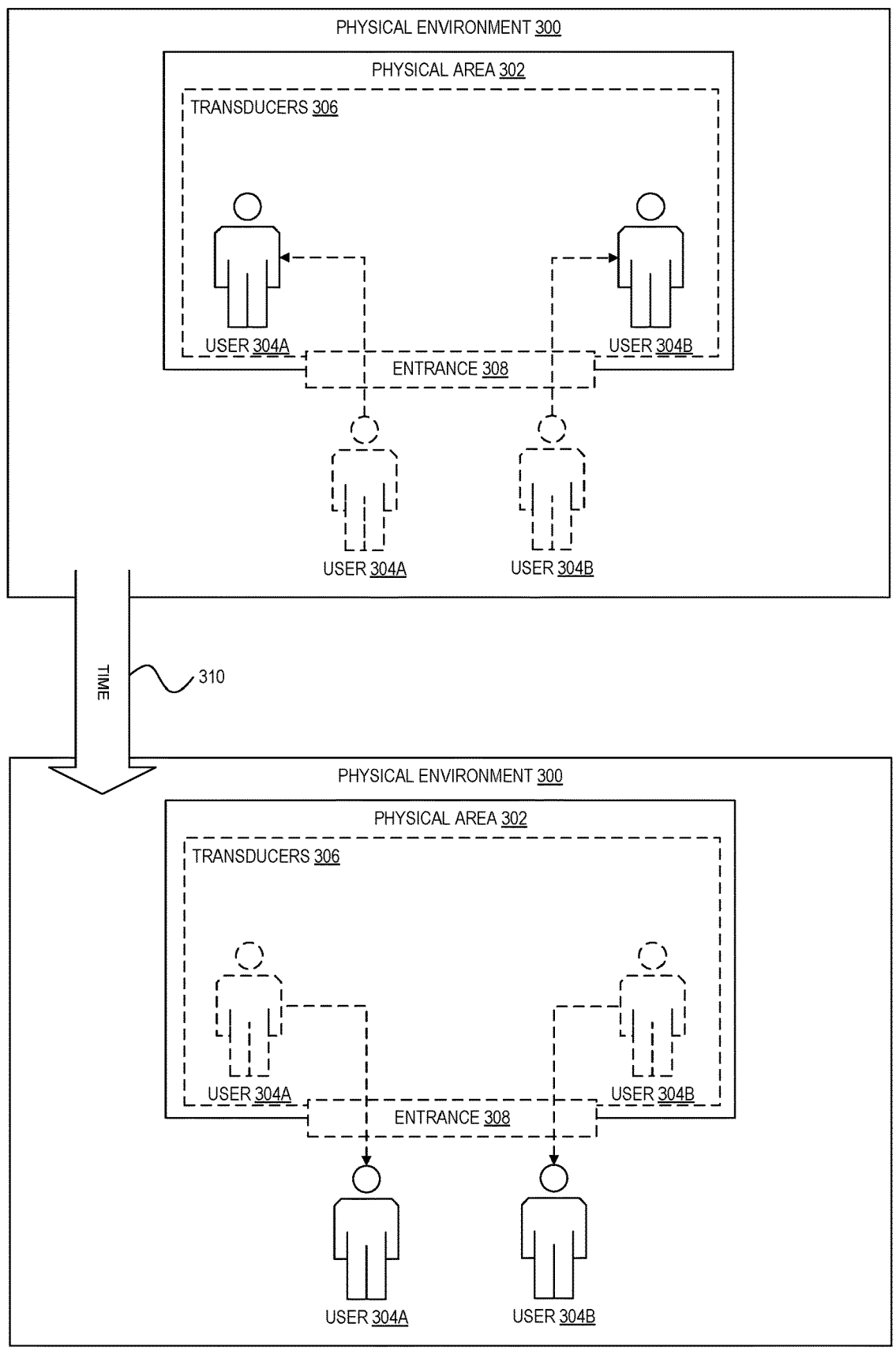
FIG. 3 is a diagram illustrating a physical environment for a virtual experience according to some embodiments.

FIG. 3 is a diagram illustrating a physical environment for a virtual experience according to some embodiments. As shown in FIG. 3, an experience participant 304A and an experience participant 304B enter a physical area 302 via a physical entrance 308. For example, the entrance 308 may be a doorway and the physical area 302 may be otherwise partially or totally enclosed by walls. In other examples, the physical area 302 is defined by physical markers other than walls. In an embodiment, the physical area 302 includes transducers 306, which may be installed in the floor or other feature of the physical area 302 such that the participant 304A and participant 304B can feel the transducers 306 when activated. Although two participants are shown in FIG. 1, in general, an experience can be concurrently experienced by any number of participant or by only a single participant.

As indicated by the passage of time 310, at some later point in time, the same participants 304A and 304B exit out the same entrance 308. In other examples, the participant may exit out of an exit that is located in a different part of the physical area 302. As described in more detail hereinafter, by applying a virtual experience pillar or virtual rotation to each participant's experience of a virtual environment, each participant may experience entry and exit from a corresponding virtual area in a spatially different orientation than that of the physical environment.

Figure 4A:
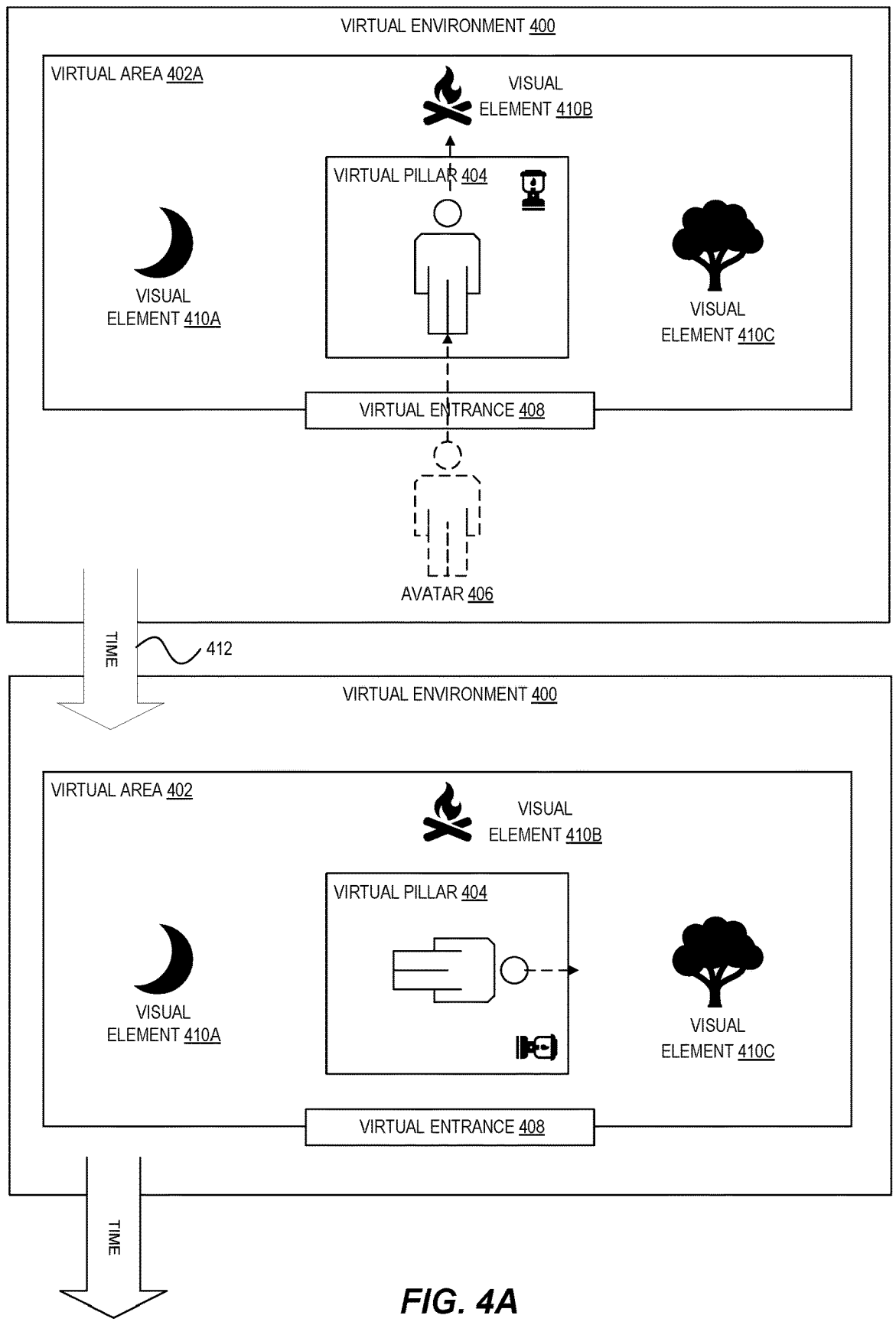

FIGS. 4A and 4B illustrate various points in time of a participant's experience of a virtual environment based on application of a virtual experience pillar technique. As shown in FIG. 4A, a participant's avatar 406 (that is, a virtual representation of the participant in a virtual environment) enters into a virtual area 402A of a virtual environment 400A via a virtual entrance 408. For example, assuming a participant is viewing the virtual environment via an HMD, the participant's HMD may display a virtual representation of a door or other entryway into a room or other type of area, which the participant to navigate into by physically passing through a corresponding physical entrance, as described in FIG. 3.

In an embodiment, the participant's view of the virtual area 402A includes various visual elements, shown as visual elements 410A-410C. These visual elements can include walls, objects, other participant avatars, or any other objects capable of visual representation in the virtual area 402A. The participant can view the visual elements of the virtual area 402A, for example, by directing the participant's gaze throughout the area, as desired.

In an embodiment, the virtual area 402A further includes a virtual pillar 404. In this example, the virtual pillar 404 represents a visual object or enclosure upon which the participant's avatar 406 stands while experiencing the virtual area 402A. As described below, the virtual pillar 404 represents a feature of the virtual environment 400A that may at times rotate such that the participant's avatar 406 is oriented differently relative to the virtual area 402A and the virtual environment 400A generally. The virtual pillar 404 may include one or more objects that help the participant visually anchor his or her position relative to the virtual pillar 404 and the other visual elements of the virtual area 402A. For the example, the visual anchors can include the floor or surface of the pillar, one or more enclosing walls, or other objects in relatively close proximity to the avatar 406 in the virtual area 402A. These anchor objects, for example, may help the participant visually comprehend that at times the virtual pillar 404 is rotating within the environment and is therefore causing the participant's view of the virtual environment to change.

As shown in FIG. 4A, after time 412 has elapsed, the orientation participant's avatar 406 has changed within the virtual area 402. For example, during the participant's experience of the virtual environment 400, the virtual pillar 404 upon which the participant's avatar is standing begins to rotate. In this example, the position of visual elements 410A-410C within the virtual environment 400 remain the same while the visual representation of the virtual pillar 404, and any associated anchor objects, have rotated approximately 45 degrees. In an embodiment, the rotation of the virtual pillar 404 in the virtual environment 400 occurs without reference to how the participant may move within the physical space during the same timeframe. For example, if the participant remains stationary in the physical space while the virtual pillar 404 rotates, the participant's view of the virtual environment 400 will be reoriented relative to the participant's orientation in the physical environment.

The participant's experience of the virtual pillar 404 rotating without a corresponding rotation in the participant's physical environment may in some cases cause the participant various types of discomfort (e.g., motion sickness). In some embodiments, to help alleviate these sensations in some participants, and to generally distract the participant from the divergence in the participant's virtual environment orientation compared to the participant's physical environment orientation, the experience is configured to activate transducers (e.g., transducers 306) that can be felt by the participant. The transducers generally may be activated at any point in time relative to when the rotation is occurring and may continue to be activated for some or all of the duration of the rotating.

FIG. 4B includes block diagrams continuing the example described in FIG. 4A. For example, after time 414 has elapsed, the virtual pillar 504 has continued to rotate and the participant's avatar 406 is now oriented approximately 180 degrees relative to the participant's original orientation in the virtual area 402. As indicated above, this rotation of the participant's avatar is performed in the virtual environment 400 without reference to the participant's orientation in the participant's physical environment. Thus, the participant's avatar 406 may now be facing in a direction that is 180 degrees relative to the avatar's orientation when it initially stood on the virtual pillar 404, even though the participant may remain stationary in the participant's physical environment throughout the process.

After some further period of time 416, the participant may cause his or her avatar 406 to exit the virtual area 402 via the virtual entrance 408. In some examples, the virtual entrance 408 may be the same virtual entrance the participant used to enter the virtual area 402; in other examples, the participant may cause his or her avatar to exit via a passageway in the virtual area 402 that is different than the one the participant used to enter the area, for example, because the entrance also rotated with the participant's avatar 406 or the virtual pillar 404 rotated more or less than 180 degrees. In general, such uses of a virtual pillar within a virtual environment can enable a limited physical environment to be presented as a relatively larger or more complex virtual environment without the participant being aware of the divergence between the two.

Figure 5A:
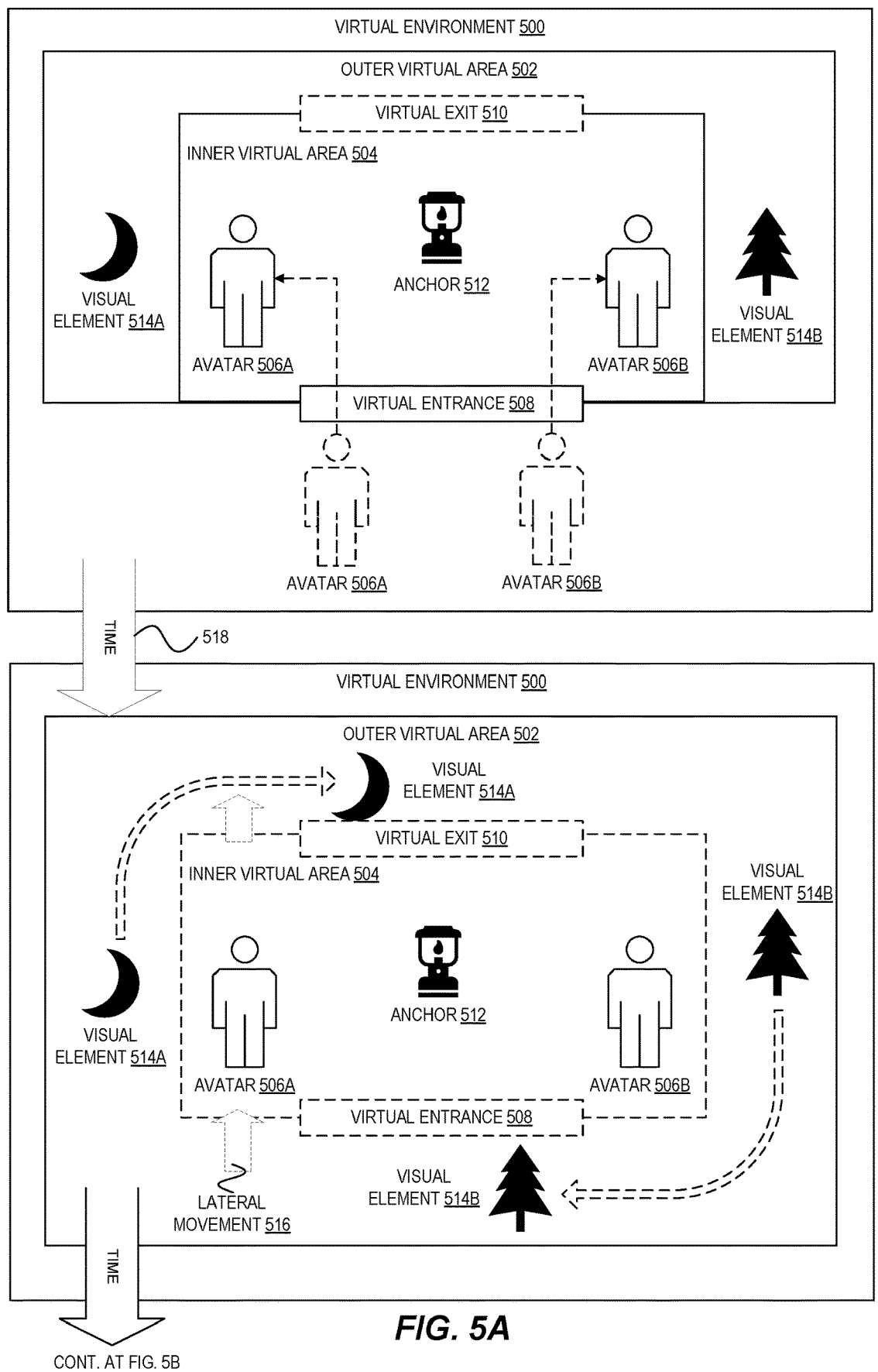
FIGS. 5A and 5B are diagrams illustrating another example a participant's experience in a virtual environment including virtual experience pillar techniques according to some embodiments.
Figure 5B:
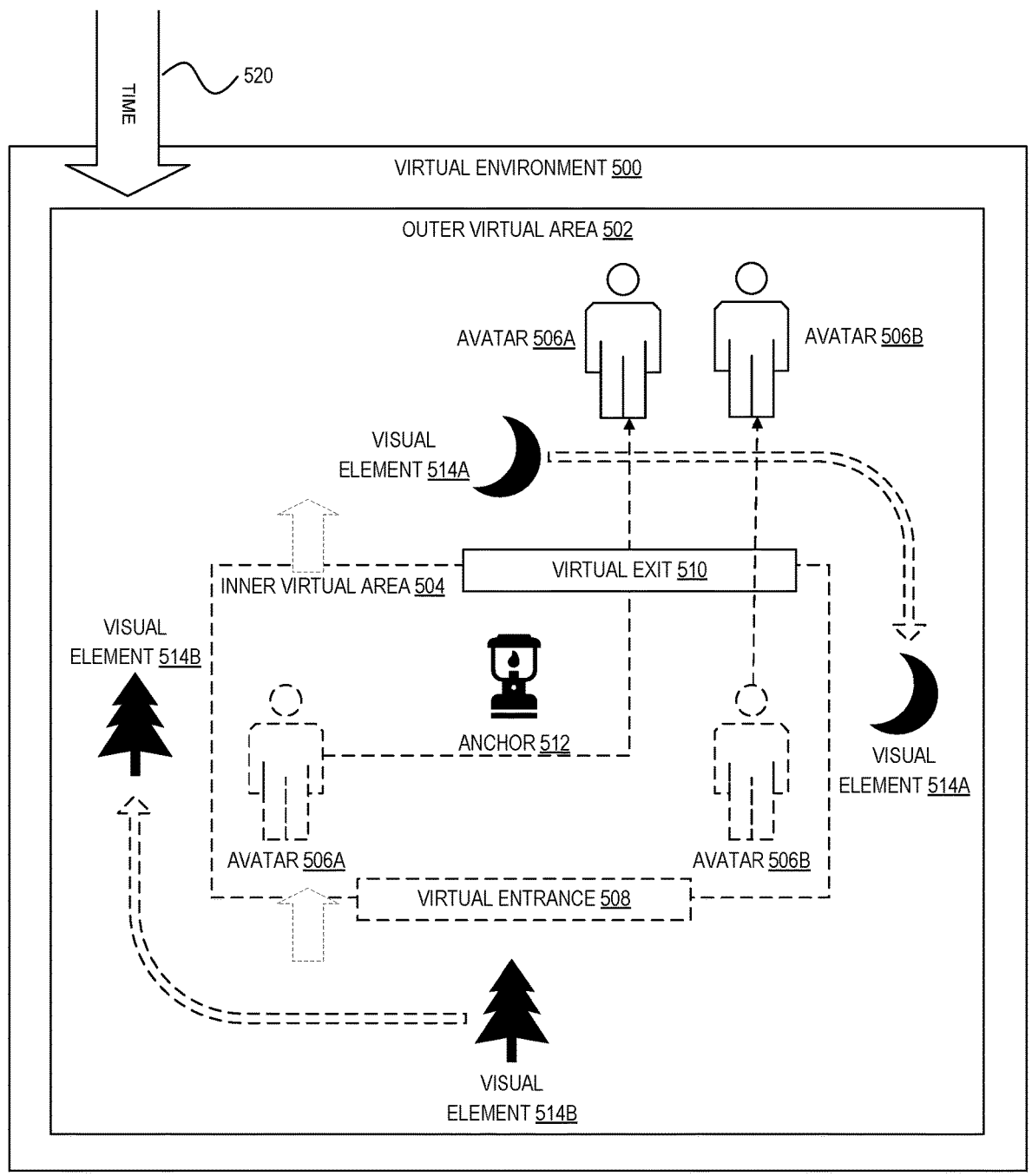

FIGS. 5A and 5B illustrate another example of various points in time of a participant's experience of a virtual environment based on application of a virtual experience rotation technique. Similar to FIGS. 4A and 4B, FIG. 5A illustrates two avatars 506A and 506B entering an inner virtual area 504 via a virtual entrance 508. The inner virtual area 504 is part of a virtual environment 500 also including an outer virtual area 502. For example, the inner virtual area 504 may include a structure or enclosure (e.g., a vehicle, a boat, a floating platform, etc.) into which the participants' avatars enter in the virtual environment 500. In some embodiments, the inner virtual area 504 includes one or more visual anchors 512 which, as described above, can help the participants orient themselves with respect to the inner virtual area 504 and/or the outer virtual area 502.

In an embodiment, after an amount of time 518 has elapsed, a virtual experience rotation technique is applied to the participants' experience of the virtual environment 500. In this example, as shown in FIG. 5A, the outer virtual area 502 begins to rotate such that the participants' view of the outer virtual area 502 and visual elements 514A is reoriented relative to the participants' view of the inner virtual area 504 and any anchor objects, which remain stationary. Similar to the example described with respect to FIGS. 4A and 4B, the rotation of the outer virtual area 502 is performed irrespective of the participants' orientation/rotation within the participants' physical environment. For reasons similar to those discussed elsewhere herein, such rotation may be accompanied by the activation of transducers in the physical environment that can be felt by the participants.

As shown in FIG. 5B, after an amount of time 520 has elapsed, the rotation of the outer virtual area 502 may continue to approximately 180 degrees (or to any other defined amount of rotation). Once the rotation stops, the participants cause their avatars 506A and 506B to leave the inner virtual area 504 via a virtual exit 510. In comparison to FIG. 4A, 4B in which a local pillar was rotated to cause the orientation of a participant's avatar to change, in this example, an outer virtual area is rotated relative to a stationary inner virtual area at which the participants' avatars are located, although the end result may be largely the same in both examples.

Figure 6:
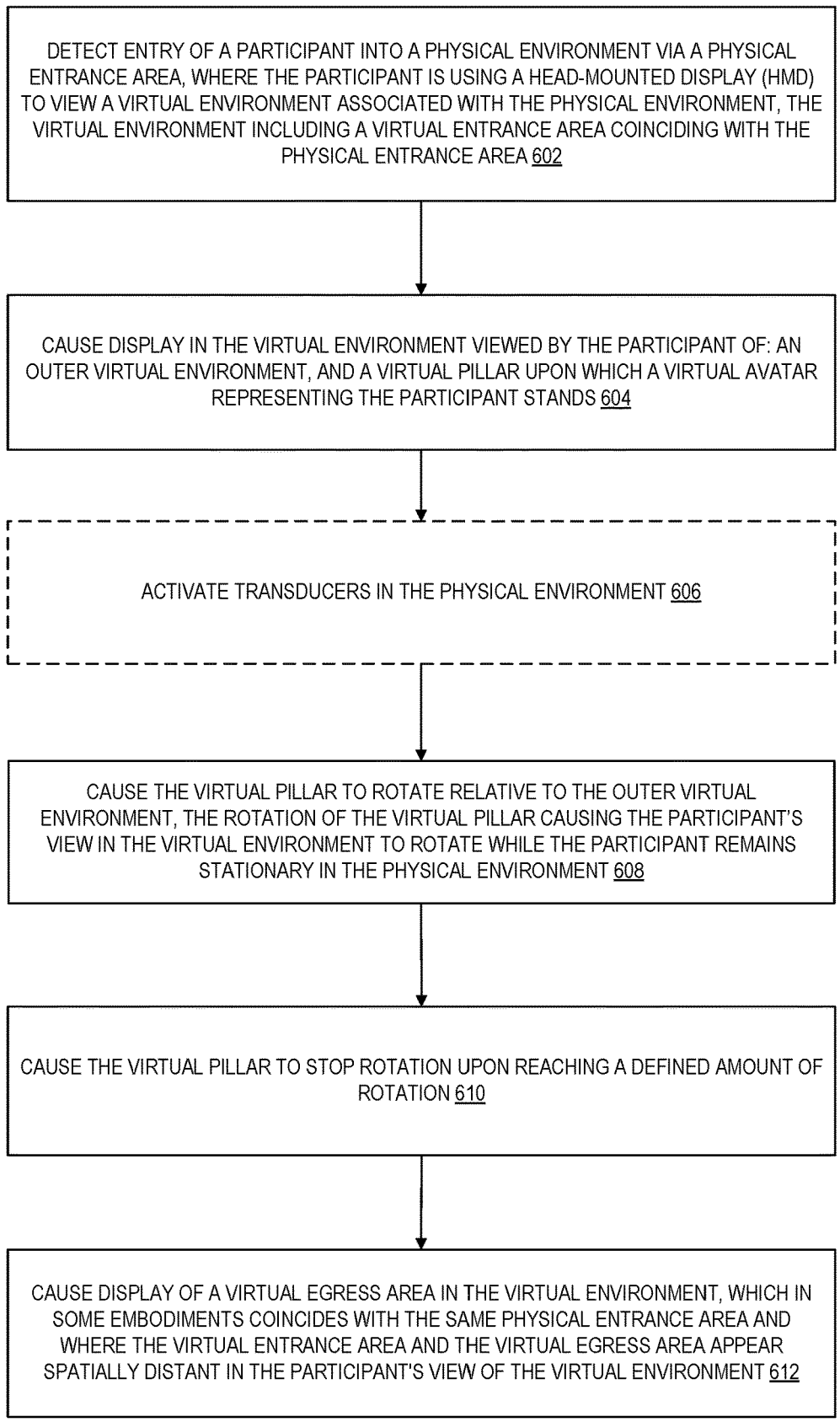
FIG. 6 is a flow diagram illustrating operations of a method for using a virtual experience pillar in a virtual experience according to some embodiments.

FIG. 6 is a flow diagram illustrating operations 600 of a method for using a virtual experience pillar in a virtual experience according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by server computer(s), player computer(s), and possibly other components of the other figures.

The operations 600 include, at block 602, detecting entry of a participant into a physical environment via a physical entrance area, where the participant is using a head-mounted display (HMD) to view a virtual environment associated with the physical environment, the virtual environment including a virtual entrance area coinciding with the physical entrance area.

The operations 600 further include, at block 604, causing display in the virtual environment viewed by the participant of: an outer virtual environment, and a virtual pillar upon which a virtual avatar representing the participant stands.

The operations 600 further include, at block 606, optionally, activating transducers in the physical environment.

The operations 600 further include, at block 608, causing the virtual pillar to rotate relative to the outer virtual environment, the rotation of the virtual pillar causing the participant's view in the virtual environment to rotate while the participant remains stationary in the physical environment.

The operations 600 further include, at block 610, causing the virtual pillar to stop rotation upon reaching a defined amount of rotation.

The operations 600 further include, at block 612, causing display of a virtual egress area in the virtual environment, which in some embodiments coincides with the same physical entrance area and where the virtual entrance area and the virtual egress area appear spatially distant in the participant's view of the virtual environment.

Figure 7:
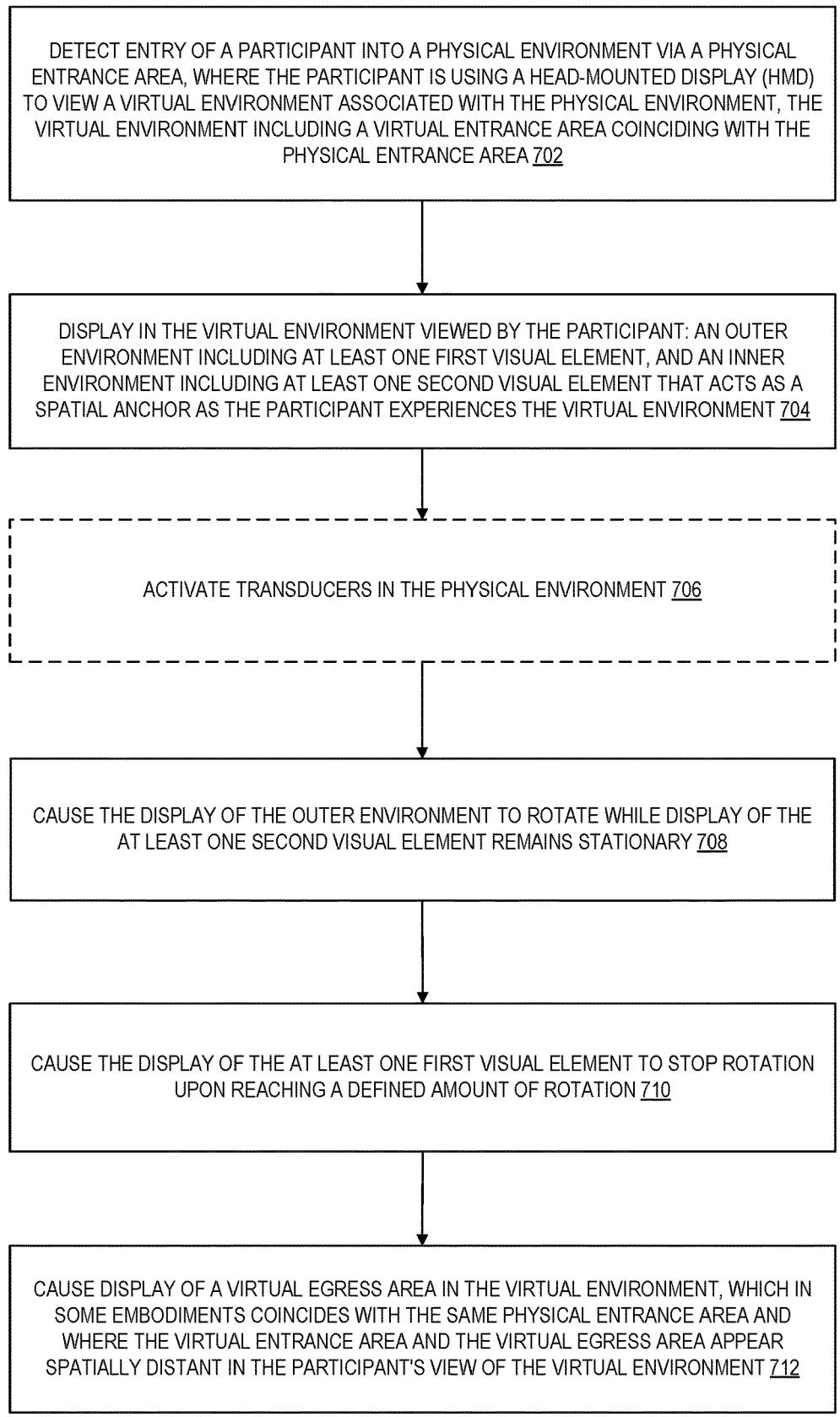
FIG. 7 is a flow diagram illustrating operations for another method for using a virtual experience pillar in a virtual experience according to some embodiments.

FIG. 7 is a flow diagram illustrating operations 700 of a method for using a virtual experience pillar in a virtual experience according to some embodiments. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by game computer(s), player computer(s), and possibly other components of the other figures.

The operations 700 include, at block 702, detecting entry of a participant into a physical environment via a physical entrance area, where the participant is using a head-mounted display (HMD) to view a virtual environment associated with the physical environment, the virtual environment including a virtual entrance area coinciding with the physical entrance area.

The operations 700 further include, at block 704, causing display in the virtual environment viewed by the participant: an outer environment including at least one first visual element, and an inner environment including at least one second visual element that acts as a spatial anchor as the participant experiences the virtual environment.

The operations 700 further include, at block 706, optionally, activating transducers in the physical environment.

The operations 700 further include, at block 708, causing the display of the outer environment to rotate while display of the at least one second visual element remains stationary.

The operations 700 further include, at block 710, causing the display of the at least one first visual element to stop rotation upon reaching a defined amount of rotation.

The operations 700 further include, at block 712, causing display of a virtual egress area in the virtual environment, which in some embodiments coincides with the same physical entrance area and where the virtual entrance area and the virtual egress area appear spatially distant in the participant's view of the virtual environment.

Figure 8:
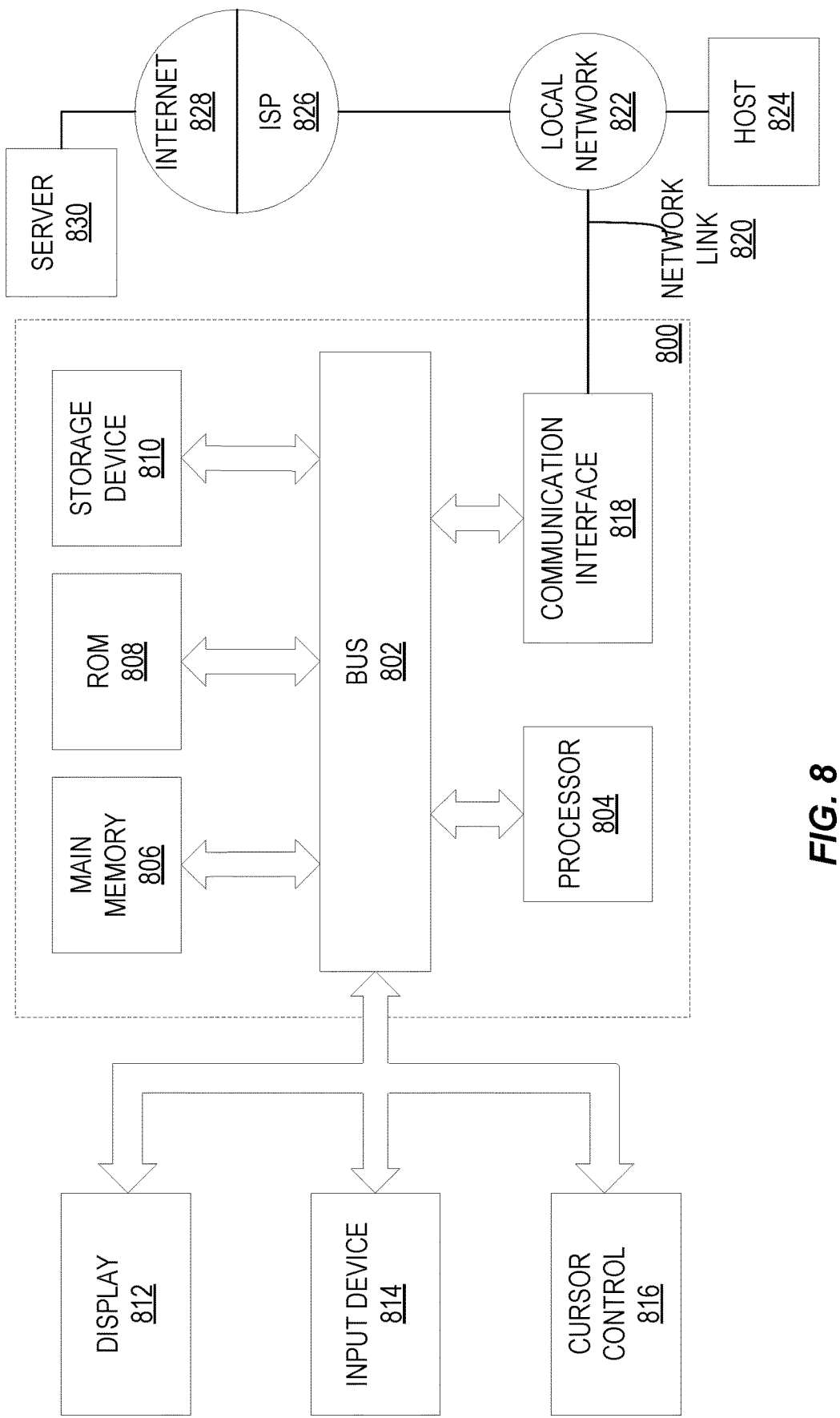
FIG. 8 is a block diagram illustrating an example computer system that may be used in some embodiments.

In some embodiments, a system that implements a portion or all of the techniques for displaying and using virtual pillars in virtual experience environments as described herein may include a general-purpose computer system that includes or is configured to access one or more computer-accessible media, such as computer system 800 illustrated in FIG. 8. In the illustrated embodiment, computer system 800 includes one or more processors 804 coupled to a system memory 806 via an input/output (I/O) interface. Computer system 800 further includes a network interface 818 coupled to I/O interface. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 804, or a multiprocessor system including several processors 804 (e.g., two, four, eight, or another suitable number). Processors 804 may be any suitable processors capable of executing instructions. For example, in various embodiments, processors 804 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 804 may commonly, but not necessarily, implement the same ISA.

System memory 806 may store instructions and data accessible by processor(s) 804. In various embodiments, system memory 806 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 806 as code and data.

In one embodiment, I/O interface may be configured to coordinate I/O traffic between processor 804, system memory 806, and any peripheral devices in the device, including network interface 818 or other peripheral interfaces. In some embodiments, I/O interface may perform any necessary protocol, timing or other data transformations to convert data signals from one component (e.g., system memory 806) into a format suitable for use by another component (e.g., processor 804). In some embodiments, I/O interface may include support for devices attached through various types of peripheral buses, such as a variant of the Peripheral Component Interconnect (PCI) bus standard or the Universal Serial Bus (USB) standard, for example. In some embodiments, the function of I/O interface may be split into two or more separate components, such as a north bridge and a south bridge, for example. Also, in some embodiments some or all of the functionality of I/O interface, such as an interface to system memory 806, may be incorporated directly into processor 804.

Network interface 818 may be configured to allow data to be exchanged between computer system 800 and other devices attached to a network or networks 822 and 828, such as other computer systems or devices as illustrated in FIG. 1, for example. In various embodiments, network interface 818 may support communication via any suitable wired or wireless general data networks, such as types of Ethernet network, for example. Additionally, network interface 818 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 806 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 806 or another type of memory. Further, a computer-accessible medium may include transmission media or signals such as electrical, electromagnetic, or digital signals, conveyed via a communication medium such as a network and/or a wireless link, such as may be implemented via network interface 818.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method implemented by a virtual experience system comprising one or more computing devices running within a networked computing environment and configured to cause display of a virtual pillar in a virtual experience environment viewed by at least one participant, the method comprising:

detecting entry of a participant into a physical environment via a physical entrance area, wherein the participant uses a head-mounted display (HMD) to view a virtual environment associated with the physical environment, and wherein the virtual environment includes a virtual entrance area coinciding with the physical entrance area;

in the virtual environment viewed by the participant, causing display of: an outer virtual environment, the virtual pillar upon which a virtual avatar representing the participant stands, and at least one visual element that visually anchors a first position of the participant with respect to a second position of the virtual pillar;

causing the virtual pillar to rotate relative to the outer virtual environment, wherein the rotation of the virtual pillar causes the participant's view in the virtual environment to rotate while the participant remains stationary in the physical environment;

activating transducers in the physical environment in association with causing the virtual pillar to rotate relative to the outer virtual environment;

causing the virtual pillar to stop rotation upon reaching a defined amount of rotation; and causing display of a virtual egress area in the virtual environment, wherein the virtual egress area coincides with the physical entrance area, and wherein the virtual entrance area and the virtual egress area appear spatially distant in the participant's view of the virtual environment.

2. The method of claim 1, wherein a participant computer is positioned on the participant, and wherein the participant computer is coupled to the HMD that displays the virtual environment to the participant.

3. The method of claim 1, wherein a server computer receives updated virtual information from a participant computer coupled to the participant and provides updates to at least one other participant computer in the physical environment based on the updated virtual information.

4. The method of claim 1, wherein the physical environment is at least partially enclosed by walls.

5. The method of claim 1, wherein the virtual environment is experienced concurrently by a plurality of participants including the participant.

6. The method of claim 1, wherein the virtual pillar is displayed by an object upon which the virtual avatar representing the participant stands in the virtual environment.

7. A computer-implemented method comprising:

detecting entry of a participant into a physical environment via a physical entrance area, wherein the participant is using a head-mounted display (HMD) to view a virtual environment associated with the physical environment, and wherein the virtual environment includes a virtual entrance area coinciding with the physical entrance area;

causing display in the virtual environment viewed by the participant: an outer environment including at least one first visual element, and an inner environment including at least one second visual element that visually anchors the participant to the inner environment;

causing the display of the outer environment to rotate while display of the at least one second visual element remains stationary;

activating transducers in the physical environment in association with causing the display of the outer environment to rotate while display of the at least one second visual element remains stationary;

causing the display of the at least one first visual element to stop rotation upon reaching a defined amount of rotation; and causing display of a virtual egress area in the virtual environment, wherein the virtual egress area coincides with the physical entrance area and wherein the virtual entrance area and the virtual egress area appear spatially distant in the participant's view of the virtual environment.

8. The method of claim 7, wherein a participant computer is positioned on the participant, and wherein the participant computer is coupled to the HMD that displays the virtual environment to the participant.

9. The method of claim 7, wherein a server computer receives updated virtual information from a participant computer coupled to the participant and provides updates to at least one other participant computer in the physical environment based on the updated virtual information.

10. The method of claim 7, wherein the physical environment is at least partially enclosed by walls.

11. The method of claim 7, wherein the virtual environment is experienced concurrently by a plurality of participants including the participant.

12. The method of claim 7, wherein the inner environment is displayed by an object upon which an avatar representing the participant stands in the virtual environment.

13. A system comprising:
a first one or more electronic devices implementing a server computer, wherein the server computer includes instructions that upon execution cause the server computer to:
detect entry of a participant into a physical environment via a physical entrance area, wherein the participant is using a head-mounted display (HMD) to view a virtual environment associated with the physical environment, and wherein the virtual environment includes a virtual entrance area coinciding with the physical entrance area;

cause display in the virtual environment viewed by the participant: an outer environment including at least one first visual element, and an inner environment including at least one second visual element that visually anchors the participant to the inner environment;

cause the display of the outer environment to rotate while display of the at least one second visual element remains stationary;

activate transducers in the physical environment in association with causing the display of the outer environment to rotate while display of the at least one second visual element remains stationary;

cause the display of the at least one first visual element to stop rotation upon reaching a defined amount of rotation; and cause display of a virtual egress area in the virtual environment, wherein the virtual egress area coincides with the physical entrance area and wherein the virtual entrance area and the virtual egress area appear spatially distant in the participant's view of the virtual environment;

a first one or more electronic devices implementing a participant computer, wherein the participant computer includes instructions that upon execution cause the participant computer to cause the HMD to display the virtual environment viewed by the participant.

14. The system of claim 13, wherein the participant computer is positioned on the participant, and wherein the participant computer is coupled to the HMD that displays the virtual environment to the participant.

15. The system of claim 13, wherein the server computer receives updated virtual information from the participant computer coupled to the participant and provides updates to at least one other participant computer in the physical environment based on the updated virtual information.

16. The system of claim 13, wherein the physical environment is at least partially enclosed by walls.

17. The system of claim 13, wherein the virtual environment is experienced concurrently by a plurality of participants including the participant.

* * * * *